US009838319B2

(12) United States Patent
Armstrong et al.

(10) Patent No.: US 9,838,319 B2
(45) Date of Patent: Dec. 5, 2017

(54) ENCAPSULATION SYSTEM FEATURING AN INTELLIGENT NETWORK COMPONENT

(75) Inventors: Nicholas Armstrong, Waterloo (CA); Robert Robinson, Waterloo (CA); Jakub Schmidtke, Waterloo (CA)

(73) Assignee: WILMERDING COMMUNICATIONS LLC, San Antonio, TX (US)

( * ) Notice: Subject to any disclaimer, the term of this patent is extended or adjusted under 35 U.S.C. 154(b) by 786 days.

(21) Appl. No.: 13/245,134

(22) Filed: Sep. 26, 2011

(65) Prior Publication Data

US 2013/0080612 A1    Mar. 28, 2013

(51) Int. Cl.
*G06F 15/16* (2006.01)
*H04L 12/813* (2013.01)
*H04L 29/08* (2006.01)
*H04L 12/725* (2013.01)

(52) U.S. Cl.
CPC ........ *H04L 47/20* (2013.01); *H04L 29/08072* (2013.01); *H04L 45/302* (2013.01); *H04L 2212/00* (2013.01)

(58) Field of Classification Search
CPC .......................... H04L 29/06; H04L 29/08072
USPC .......................... 709/220, 224, 228; 370/252
See application file for complete search history.

(56) References Cited

U.S. PATENT DOCUMENTS

| | | | |
|---|---|---|---|
| 5,402,478 A * | 3/1995 | Hluchyj et al. | 379/221.01 |
| 6,574,197 B1 * | 6/2003 | Yaguchi et al. | 370/252 |
| 7,457,859 B1 * | 11/2008 | Schick et al. | 709/223 |
| 7,539,175 B2 | 5/2009 | White et al. | |
| 7,821,929 B2 | 10/2010 | DelRegno et al. | |
| 8,498,297 B2 * | 7/2013 | Bragg et al. | 370/395.53 |
| 8,520,615 B2 * | 8/2013 | Mehta et al. | 370/329 |
| 8,638,669 B2 * | 1/2014 | Nishioka | H04L 45/302 370/236 |
| 8,880,716 B2 * | 11/2014 | Riggert | H04L 65/608 370/232 |
| 9,031,059 B2 * | 5/2015 | Eichen | H04W 4/16 370/242 |
| 9,088,599 B2 * | 7/2015 | Terpstra | H04L 67/1004 |

(Continued)

OTHER PUBLICATIONS

Notification of Transmittal of the International Search Report and the Written Opinion of the International Searching Authority, or the Declaration dated Jan. 14, 2013.

*Primary Examiner* — Khanh Dinh
(74) *Attorney, Agent, or Firm* — Osha Liang LLP

(57) ABSTRACT

A network component is provided for facilitating communication of traffic between a destination server and a client over a network comprising the plurality of network paths. The network component comprising memory for storing computer-readable instructions and a processor configured to implement the computer-readable instructions. The computer-readable instructions operable to implement the following: exchange control parameters with the client via a control channel using one or more of the plurality of network control paths; encapsulate the traffic for transmission to the client; decapsulate the traffic received from the client; and schedule traffic to the client via one or more of the plurality of network paths using logic common with the client based on network parameters. A client configured to work with the network component is also described, as is a communication system including both the client and network component.

22 Claims, 4 Drawing Sheets

(56) References Cited

U.S. PATENT DOCUMENTS

| | | | |
|---|---|---|---|
| 9,350,638 B2* | 5/2016 | Felgate | H04W 4/14 |
| 2002/0172157 A1* | 11/2002 | Rhodes | 370/238 |
| 2004/0088385 A1* | 5/2004 | Blanchet et al. | 709/220 |
| 2006/0248202 A1* | 11/2006 | Blanchet et al. | 709/227 |
| 2009/0274199 A1* | 11/2009 | Onodera | H04L 27/0008 |
| | | | 375/219 |
| 2011/0023090 A1 | 1/2011 | Asati et al. | |
| 2011/0235595 A1* | 9/2011 | Mehta et al. | 370/329 |
| 2015/0341252 A1* | 11/2015 | Felgate | H04W 4/14 |
| | | | 398/38 |

\* cited by examiner

ENCAPSULATION SYSTEM FEATURING AN INTELLIGENT NETWORK COMPONENT

The present invention relates generally to an encapsulation system and specifically to a system for encapsulating data and transmitting it across a network featuring one or more intelligent network components.

BACKGROUND

Network encapsulation systems are used to provide features and capabilities to a network that otherwise would not support these capabilities or features due to its design, by running a new protocol over an existing protocol. Typically, these encapsulation systems take Internet Protocol (IP) traffic, also known as Layer 3 traffic in the OSI model, that is generated by client applications and wrap it in a new protocol. Encapsulation systems typically function in a bidirectional manner. That is, operations performed at a client are also performed by a network component when traffic is being sent in the reverse direction.

There are many existing encapsulation systems in use today. The Internet Engineering Task Force (IETF) has standardized a variety of encapsulation systems that accomplish different goals. Examples of such encapsulation systems include IPsec for providing security and integrity, Mobile IP for allowing devices to maintain an IP address as they move across the Internet, and Generic Routing Encapsulation (GRE) for simplifying routing traffic from a variety of different customers with conflicting address spaces across the same network.

Further, encapsulation can be used in systems designed to aggregate bandwidth provided by multiple networks paths. For example, U.S. patent application Ser. No. 13/004,652, titled "Communication Between Client and Server Using Multiple Networks" by Manku et al. (the '652 application) and U.S. Pat. No. 7,539,175, titled "Multi-Access Terminal with Capability for Simultaneous Connectivity to Multiple Communication Channels" by White et al. (the '175 patent) each describe different solutions for using a plurality of different network paths.

Because of the inherent nature of encapsulation systems, there is communication overhead in terms of bandwidth and latency involved in establishing and maintaining a communication channel. The overhead is exacerbated when multiple channels are created and maintained as in the case of the '652 application and the '175 patent.

Accordingly, it is desirable to provide an encapsulation system in which the communication overhead can be reduced.

SUMMARY OF THE INVENTION

In existing encapsulation systems, the client drives all of the interface selection decisions. The network component does not participate in the packet routing decision process, and this can result in poor performance and a large amount of signalling traffic during rapidly changing network conditions. In contrast, the present invention provides intelligent traffic routing logic that resides on both sides of the communication network, improving the performance of the system while reducing the amount of signalling traffic required.

In accordance with an aspect of the present invention there is provided an intelligent network component for facilitating communication of traffic between a destination server and a client over a network comprising the plurality of network paths, the network component comprising: memory for storing computer-readable instructions; and a processor configured to implement the computer-readable instructions, the computer-readable instructions operable to: exchange control parameters with the client via a control channel using one or more of the plurality of network control paths; encapsulate the traffic for transmission to the client; decapsulate the traffic received from the client; and schedule traffic to the client via one or more of the plurality of network paths using logic common with the client based on network parameters.

In accordance with a further aspect of the present invention there is provided a communication system for facilitating communication of traffic between a network component and a client over a network comprising a plurality of network paths, both the client and the network component comprising: memory for storing computer-readable instructions; and a processor configured to implement the computer-readable instructions, the computer-readable instructions operable to: exchange control parameters between the client and the network component via a control channel using one or more of the plurality of network control paths; encapsulate the traffic for transmission to the other of the client or the network component; decapsulate the traffic received from the other of the client or the network component; and schedule traffic between the client and the network component via one or more of the plurality of network paths using logic common with each other and based on network parameters.

BRIEF DESCRIPTION OF THE DRAWINGS

An embodiment of the present invention will now be described by way of example only with reference to the following drawing in which.

DETAILED DESCRIPTION OF THE PREFERRED EMBODIMENT

Figure 1:
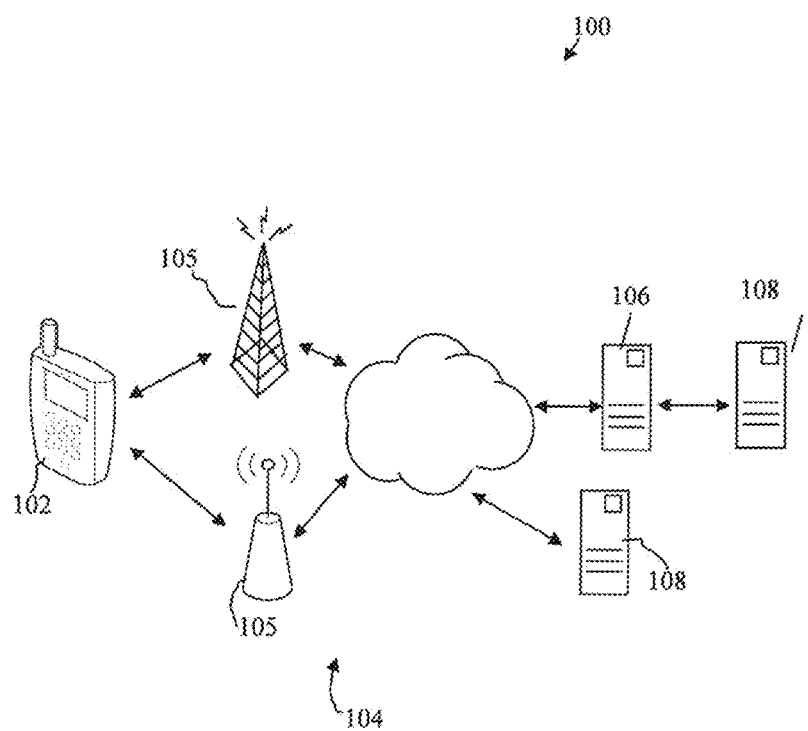
FIG. 1 is a block diagram illustrating an encapsulation system.

For convenience, like numerals in the description refer to like structures in the drawing. Referring to FIG. 1, an encapsulation system is illustrated generally by numeral 100. The encapsulation system 100 includes a client 102, a communication network 104, a network component 106, and a server 108.

The client 102 encapsulates data and transmits it, via the communication network 104, to the network component 106. The network component 106 decapsulates the data and transmits it to the server 108. Accordingly, depending on the implementation, the client 102 may refer to a personal computing device used directly by a user, such as a personal computer, notebook, tablet, smart phone, smart appliance and the like. Alternatively, the client 102 may refer to a peripheral device that is in direct communication with the personal computing device, on the same side of the network 104, such as a modem, router and the like.

Conversely, the network component 106 encapsulates data to be sent from the server 108, via the communication network 104, to the client 102, which decapsulates the data. Accordingly, the network component 106 may refer to an edge router, a proxy server and the like.

The protocol used to encapsulate the data for communication between the client 102 and the network component 106 can vary, depending on the implementation. As will be appreciated by a person of ordinary skill in the art, any of a number of known or proprietary standards can be used. In the present embodiment, the User Datagram Protocol (UDP) is used as a primary protocol and Transmission Control Protocol (TCP) is used as a secondary protocol. Thus, if a UDP channel cannot be established because it is blocked or for some other reason, then a TCP channel is established.

The communication network 104 may include a wide area network (WAN) and/or a local area network (LAN) and their corresponding access points 105. This includes, for example, public networks such as the Public Switched Telephone Network (PSTN) and the Internet, as well as private networks or intranets. The WAN may further include wireless technologies such as Worldwide Interoperability for Microwave Access (WiMax), mobile telecommunication standards, such as 2G, 3G, and 4G, and the like. The LAN may further include wireless technologies such as Wi-Fi, Bluetooth and the like. Depending on interfaces available to the client 102, it can access the communication network 104 using one or more of these wireless technologies via the corresponding access point 105, or communicate directly with the network 104.

For ease of explanation, the term "network path" will be used to refer to the communication of data between the client device 102 and the network component 106 using a particular communication technology. For example, a client device 102 having a mobile communication interface, such as a 3G interface, communicates with an access point 105, such as a 3G base station, to facilitate connection to the communication network 104. This type of connection can be considered one network path. A client device 102 having a Wi-Fi interface communicates with an access point 105, such as a Wi-Fi access point, to facilitate connection to the communication network 104. This type of connection can be considered another network path. A client device 102 having a wired interface communicates with an access point 105, such as a modem, to facilitate a terrestrial connection to the communication network 104. This type of connection can be considered yet another network path. Other types of network connections will be apparent to a person of ordinary skill in the art.

The actual configuration of the communication network 104 may vary depending on the implementation.

As described in the '652 application, different network paths can be used simultaneously to improve communication between the client 102 and the network component 106. For example, the bandwidth of the multiple network paths can be aggregated to increase the bandwidth available to the client 102. Further, multiple network paths can be used to provide a seamless handover, thus inhibiting the failure of a communication link in the event that one of the network paths fails or terminates.

In accordance with the present embodiment, software is provided at both the client 102 and the network component 106 for making measurements and enforcement decisions regarding encapsulation and routing of data. In order to facilitate this, a common core of logic is implemented at both the client 102 and the network component 106. Client-specific logic can be implemented at the client 102 alone and network-specific logic can be implemented at the network component 106 alone.

Actively engaging both the client 102 and network component 106 in the operation of the encapsulation system ensures that both the client 102 and network component 106 have an up-to-date view of the state of the system. This state includes a variety of network parameters, including incoming and outgoing packet loss, available bandwidth, system load, network qualities, flow routing and the like. Therefore, the client 102 and network component 106 cooperate to ensure data routing decisions are made in the same manner on both sides of the communication network 104. Indeed, some of the measured network parameters may require interaction between the two sides to function properly. For example upstream bandwidth requires both sides to exchange data.

The close interaction between the client 102 and the network component 106 makes it possible to improve performance, as both the client 102 and the network component 106 are actively aware of the state of the system and can act together to quickly respond to rapidly changing network conditions. This is in sharp contrast to current solutions in which the client 102 detects a change in network quality, conveys it to the network component 106 in the form of a new policy, and the network component 106 applies the new policy.

Further, a control channel is established across one or more of the network paths. The protocol used for the control channel can vary, depending on the implementation. As will be appreciated by a person of ordinary skill in the art, any of a number of known or proprietary standards can be used. In the present embodiment, TCP is used as the protocol for the control channel. TCP is used instead of UDP for the control channel because Network Address Translation (NAT) tables will cause a UDP channel without data to timeout faster than it will cause a TCP channel without data to timeout. Thus, using TCP affords a longer time between packets sent on the control channel. This can lower system overhead by decreasing the frequency that packets are transmitted to keep the control channel active. Further, using a stateless communication protocol, like UDP, is more expensive, in terms of number of transmitted packets, to keep alive as NAT devices time out UDP sessions much faster than TCP sessions, requiring more keepalive packets to be sent. Yet further, unlike UDP, TCP provides reliable communication.

The control channel can be used to provide the network component 106 access to a client 102 behind a traffic-blocking, tool, such as a firewall or a NAT device. For example, the network component 106 may have traffic for the client 102, but may not be able to initiate contact with the client because of restrictions implemented by the traffic-blocking tool. In the present embodiment, the network component 106 uses the control channel to pass a notification to the client 102, informing it that it must 'refresh' the data channel by reconnecting to the network component 106 to properly receive traffic.

The control channel is further used to synchronize the state between the client 102 and the network component 106. In order to facilitate this, a state status update signal is transmitted intermittently between one of the client 102 and the network component 106 advising the other of parameters that may only be detected at one side of the communication network 104. For example, it may not be possible for the network component 106 to determine a network interface signal strength of the network paths at the client 102. Accordingly, the client 102 intermittently transmits the signal strength to the network component 106. Conversely, it may not be possible for the client 102 to determine latency between the network component 106 and the destination server 108. Accordingly, the network component 106 intermittently transmits the latency to the client 102. These are just two examples of status information that is determined at one side of the network 104 and communicated to the other side of the network 104. Additional examples may include packet loss and bandwidth statistics as they are both measured at the side receiving the packet.

The use of the control channel makes it possible for the client 102 to push settings and policies to the network component 106, and vice versa. Accordingly, it is possible to inspect and filter traffic that enters the system before it is actually transmitted across the network 104 thereby conserving bandwidth and keeping undesired traffic off the network 104. For example, if it is known that the device 102 cannot handle, or is not permitted to handle, a particular traffic type, that traffic can be filtered out at the network component 106, rather than at the client 102. This reduces wasted bandwidth that would have been used to transmit traffic only to have it filtered out at the client 102. Conversely, if the network does not permit peer-to-peer traffic, the client 102 can filter out this traffic before it leaves the client 102, rather than waiting for filters at the network component 106 or server 108 to block this traffic.

Further, it is possible to prevent clients that do not apply the required settings from passing data. The network component 106 is able to parse and apply the policies just as the client 102 can, keeping misbehaving clients from abusing the network. For example, the network component 106 can terminate the connection with the client 102, if it is determined to be misbehaving. Alternatively, the network component 106 can permit the connection to continue, but send a message to a system administrator that the client 102 is misbehaving. Yet alternatively, the network component 106 can ensure that the policy is enforced, even if the client 102 does not enforce it. For example, if the server 108 does not permit peer-to-peer (P2P) traffic. Even if the client 102 is misbehaving and not applying a P2P filter, the P2P filter can be applied by the network component 106. Although the client 102 will transmit unnecessary traffic, the P2P filter is not compromised.

The similarity between the logic implemented on the client 102 and network component 106 makes it straightforward to add new, advanced scheduling options to the system. All that is required is to load a new scheduling module, or update an existing scheduling module, on both the client 102 and the network component 106 and new scheduling options will be made available. This is a much more flexible alternative than existing systems in which the client schedules packets and the network component simply interprets a set of flow-link assignments.

The ability to apply advanced schedulers to both the client 102 and the network component 106 makes it possible to not only support more flexible schedulers, but also to apply these schedulers in combination to obtain an improved performance in the system. For example, it is possible to apply a stream-based traffic scheduler to a number of latency-sensitive flows, such as Voice over Internet Protocol (VoIP) traffic. Simultaneously, a per-packet aggregation scheduler can be applied for a number of bulk download flows, such as video streams. Since the requirements for each flow are different, the traffic can be scheduled differently to optimize the available bandwidth over the different network paths. The system is able to properly apply these complex groupings of scheduling policies in an optimal manner because both the client 102 and the network component 106 are configured based on the same logic and can, therefore, work in tandem with each other to obtain the desired results.

Yet further, it is possible for both the client 102 and the network component 106 to independently select which of the network paths should be selected to pass traffic based upon criteria, such as Quality of Server (QoS). Having the network component 106 aware of the characteristics of each one of the network paths allows it to immediately schedule a new traffic flow based upon the expected requirements of the traffic, rather than waiting for the client 102 to make a decision and communicate it back to the network component 106. Not only does it speed up the process of network path selection, but it also makes the logic easier to implement and debug while reducing the overhead required for such an operation.

Moreover, as network conditions change, it is possible for the network component 106 to proactively move, or handoff, traffic, instead of waiting for a message from the client 102. Specifically, if the characteristics of the selected network path degrade, the client 102 and the network component 106 can independently determine to which alternate network path to move the traffic. The determination can be made based on the characteristics of the behaviour of the selected network path, the behaviour of the flow and the characteristics of the available network path, or paths. Since the correct decision will be made independently, the overhead required to implement such a change is reduced and the speed at which the system can adapt to changing network conditions is improved. This feature is particularly beneficial for QoS-sensitive applications, such as a voice call or a live video stream, since any delays in the migration process will manifest themselves as a degraded user experience.

Both the client 102 and the network element 106 are also able to perform intelligent packet buffering and, if necessary, packet duplication across all available network paths to reduce the visibility of the handoff even further.

Figure 2:
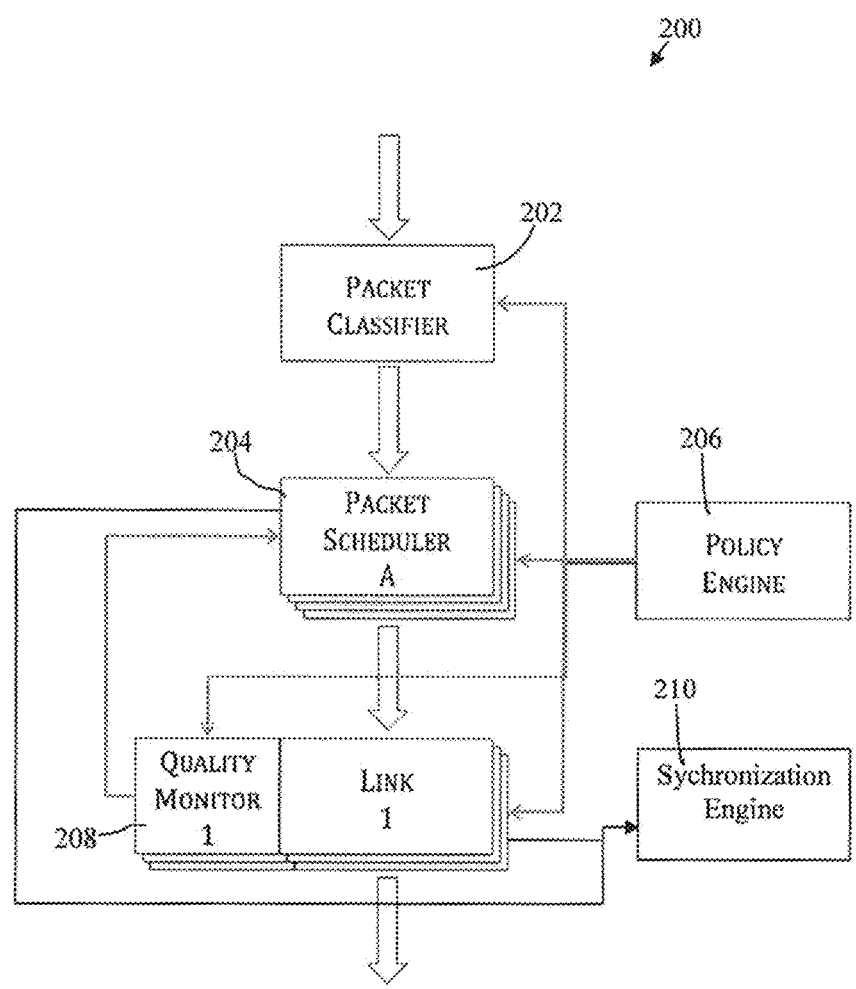
FIG. 2 is a block diagram illustrating a sample embodiment of the packet scheduling system.

Referring to FIG. 2 a plurality of modules configured at both the client 102 and the network component 106 for facilitating implementation of the encapsulation network described above are illustrated generally by numeral 200. The modules include a packet classifier 202, one or more packet schedulers 204, a policy engine 206, one or more link characteristics modules 208, and a synchronization module 210.

For ease of explanation, the term "device" refers to both the client 102 and the network component 106. The term "other side" refers to the other side of the network. Thus, for example, for the network component 106, the other side refers to the client 102. Conversely, for the client 102, the other side refers to the network component 106. The term "incoming packet" refers to a packet that is arriving at the device from the same side of the network, prior to processing by the encapsulation system. The term "outgoing packet" refers a packet that is being transmitted from the device to the other side of the network, after processing by the encapsulation system. The term "application" refers to a user application that is attempting to communicate data via the encapsulation system 100.

The packet classifier 202 takes un-encapsulated data packets and determines how to categorize them for further processing. The packet classifier is configured with a set of classification policies from the policy engine 206. The packet classifier 202 is capable of changing the classification of a packet during run-time if a classification policy changes or a new classification policy is applied. In the present embodiment, the packet classifier 202 uses criteria such as IP protocol type, source IP address, destination IP address, transport protocol type, source port and destination port (if present) to classify data packets. Adding different or additional packet analysis techniques, such as application-level packet inspection, will allow for more granular classification but does not change the design of the packet classifier as described herein. Further, other known or proprietary algorithms for classifying a packet may also be used. Some examples include a tree-based approach, a packet hashing-based approach, or a linear rule-evaluation approach.

The packet schedulers 204 are configured with a set of scheduling policies from the policy engine 206. Each packet scheduler 204 includes a scheduling algorithm that may be dynamically configured by the scheduling policies and data from the link characteristics modules 208 to determine over which interface the packet should be transmitted. One example of a scheduling algorithm is a priority-based scheduler. The scheduling policies can set the priority assigned to each interface, thereby controlling the order in which interfaces will be used as they become available or unavailable. Similarly, the priority-based scheduler can be configured to mark an interface as unavailable based on the scheduling policies and on data received from the link characteristics module 208.

The packet schedulers 204 expose themselves to the device using a common application programming interface (API) that allows the device to implement many different schedulers. Indeed, by implementing a common API, it is possible for the network component 106 to dynamically pass a new packet scheduler 204 to the client 102 and have it used without restarting the client 102 or the network component 106.

The policy engine 206 is responsible for parsing policy rules, applying any conditions to the policies, and then configuring the relevant modules with the policies. The policy engine 206 on one side of the network can query the policy engine 206 on the other side of the network for policies at start-up. Further, the policy engine 206 on one side of the network can push new policies and policy changes to the policy engine 206 on the other side as necessary. The policy module 206 is capable of caching policies to disk in order to reduce network traffic. The policies generally comprise two different elements: actions and conditions. Policy actions define particular behaviours that the device will enforce. Policy conditions define when the particular policy action should be applied. Policies can be locally defined and stored, stored at a central database, or retrieved from an external policy store such as a third generation partnership project (3GPP) policy and charging rules function (PCRF).

An example of a policy action is marking a Wi-Fi interface as having a higher priority and a 3G interface as having a lower priority. An example of a policy condition for this action is that the rule should take effect between 5:00 PM and 8:00 PM. That is, the policy action can be implemented between 5:00 PM and 8:00 PM to offload traffic from the 3G interface during peak hours. In this example, the policy condition is applied statically; at a predefined time. Alternatively, the policy condition can be applied dynamically, such as when the 3G interface exceeds 80% of its capacity. Other types of static and dynamic conditions can be defined to create a set of policies.

In the present embodiment, the policies are primarily established by a system administrator of the network component 106. This affords the system administrator greater comfort that network policies will be enforced at the client 102 as compared to prior art solutions. However, policies can also be established by a user of the client 102. The amount of freedom given to the user to establish policies will likely depend on the system implementation.

The link characteristics modules 208 are responsible for determining the current state of each interface. The state of the interface is a combination of a number of factors, and can include both measurements of current interface state, as well as predictions as to what the interface state will become in the future. Both physical interface metrics and network metrics can be taken into consideration, including latency, upstream and downstream bandwidth, upstream and downstream packet loss, signal strength, and cost. Many of these metrics, such as latency, bandwidth, signal strength, to name a few, are measured in real time, while others, such as cost, are either statically configured by an administrator, or determined once the interface becomes available by querying the user.

The link characteristics modules 208 use a combination of passive and active methods to keep the required metrics up to date. Physical interface metrics are read directly from the operating system, packet loss is measured either passively, via sequence numbers which piggyback on outgoing packets, or actively, via a probe message, when regular traffic is not available to be piggybacked on. The other side counts received sequence numbers, notes any packets that are missing, and synchronizes its measured packet drop rate with the other side when a change is detected.

The synchronization module 210 is responsible for keeping data on the client 102 and the network component 106 in a compatible state, in a manner that minimizes the amount of data that needs to be sent between the devices. Instead of transferring all of the measurement values to the other side, the device may aggregate the available measurement values into a qualitative measure. For example, the interface can be determined to be 'Good', 'Unstable', 'Bad', and the like. The qualitative measure is transmitted to the other side when it changes.

Further, the device may choose to send only some of the available metrics to the other side, based upon the degree of change of the value. For example, if a metric only changes in value by a small percentage, such as 1% for example, the update may not be transmitted. However, if this metric changes by a larger amount, such as 10% for example, the updated value may be transmitted. These thresholds for update are configured based upon a policy. The values that may be updated on the other side are selected based upon the scheduler in use. Yet further, the client 102 and the network component 106 may choose to send different values to each other, based upon the needs of the scheduling algorithm.

Each packet scheduler 204 performs its own form of measurement aggregation, based upon a predefined level of precision required and the specific metrics used when making scheduling decisions, allowing for a fine-grained amount of control over the behaviour of each packet scheduler 204 while also reducing the amount of signalling overhead required to have both the client 102 and the network component 106 schedule packets in an equivalent manner. Thus, the cost of using the system is reduced, as per-byte billing is common, and the capacity available for user data to be transferred is increased compared to prior art systems.

An exemplary flow of data from an application executing on the client 102 to the server 108 is described as follows. The application structures the data into data packets for transmission. The client 102 receives the data packets from the application and provides them to the packet classifier 202. The packet classifier 202 classifies the data packets and transmits them to corresponding ones of the packet schedulers 204 based, at least in part, upon the classification. The packet schedulers 204 schedule the data packets across one or more of the different links. The data packets are encapsulated, depending on the protocol used to transmit them across the communication network 104, and then transmitted to the network component 106. The network component decapsulates 106 the received packets, and transmits the data packets to the server 108. Both the device 102 and 106 may filter the packet and prevent its transmission, if it is detected to be blocked by a filter.

An exemplary flow of data from an application executing on the server 108 to the client 102 is described as follows. The application structures the data into data packets for transmission and transmits them to the network component 106. The network component 106 receives the data packets and provides them to the packet classifier 202. The packet classifier 202 classifies the data packets and transmits them to corresponding ones of the packet schedulers 204 based, at least in part, upon the classification. The packet schedulers 204 schedule the data packets across one or more of the different links. The data packets are encapsulated, depending on the protocol used to transmit them across the communication network 104, and then transmitted to the client 102. The client 102 decapsulates the received packets, encapsulates them based on the protocol used to transmit them to the application, and transmits the data packets to the application. Again, based upon the configured set of filters, the packet may be dropped prior to transmission by either device 102 or 106.

In an alternative embodiment, the packet classifier 202 sends both the data packet and its corresponding classification to the packet scheduler 204. The packet scheduler 204 determines which scheduling algorithm to apply based, at least in part, on the classification.

Figure 3:
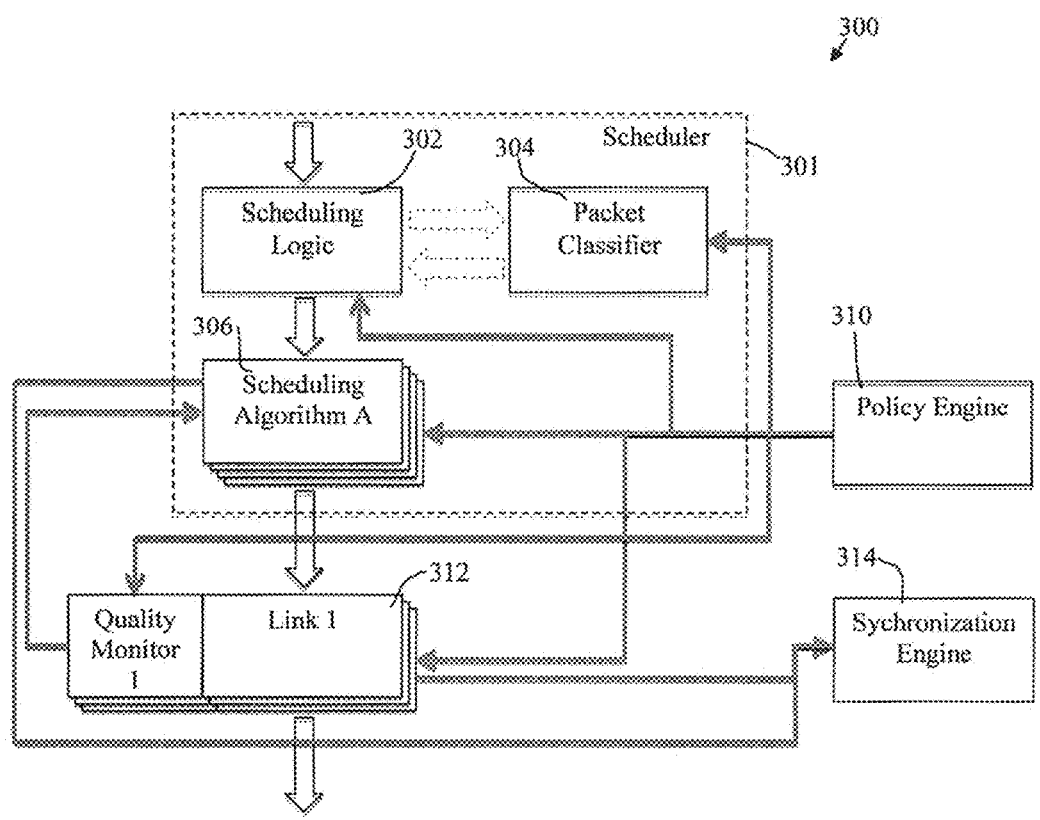
FIG. 3 is a block diagram illustrating an alternate embodiment of the packet scheduling system.

In yet an alternative embodiment, a single scheduler exists that performs both the packet classification and packet scheduling roles in a single logical unit. This avoids issues where multiple schedulers attempt to apply conflicting algorithms, or fail to take into consideration the state of other active algorithms. Referring to FIG. 3 a plurality of modules configured at both the client 102 and the network component 106 for facilitating this embodiment are illustrated generally by numeral 300. The modules include a packet scheduler 301, scheduling logic 302, packet classification logic 304, one or more scheduling algorithms 306, a policy engine 310, one or more link characteristics modules 312, and a synchronization module 314.

The packet scheduler 300 receives a packet, and passes this packet to the scheduling logic 302. The scheduling logic 302 is responsible for determining how the packet should be processed, and is controlled via a policy specified for this scheduler. Having a single point of scheduling logic, embodied in the scheduling logic 302 block, makes it possible to improve the behaviour of the overall scheduler. It avoids issues that arise when otherwise independent scheduling algorithms would conflict with each other, enables simple feedback control mechanisms to be implemented that avoid undesirable packet scheduling feedback loops, and reduces both client 102 and network component 106 resource requirements by simplifying the synchronization logic.

The packet classifier 304 may be passed a packet based on the configuration of the scheduling logic 302. For example, in a simple, lowest-cost scheduler, no packet classification is required since all packets are passed out a single network path, the one with the lowest cost. Functionally, it is implemented in a manner similar to that of the packet classifier 202. Extending the capabilities of packet classifier 202, the packet classifier 304 is capable of only partially classifying the packet based upon the requirements of scheduling logic 302. For example, if the scheduler is simply scheduling TCP packets in one manner and all other traffic in another, it is sufficient for the packet classifier 304 to only examine a single field in the packet instead of examining the packet in its entirety. Selectively classifying traffic based upon the needs of the scheduling logic 302 can reduce processing overhead in situations where classification is either not required, or only partial classification is necessary.

The scheduling algorithms 306 receive a packet, and using both the network paths and their associated states makes a decision as to which link the packet is sent over. These scheduling algorithms are similar in both behaviour and structure to the packet schedulers 204.

The link characteristic module 312 records only the link characteristics required by the active scheduling algorithms 306. This is specified by the scheduling logic 302. Otherwise, they function as the link characteristic module 208.

The policy engine 310, and the synchronization module 314 are the same as their counterparts 208 and 210, respectively.

The encapsulation network 100 described above provides a number of advantages. For example, it is capable of performing "selective offload" of application traffic. Selective offload refers to the ability to dynamically direct some traffic over a particular interface, while directing the rest of the traffic over one or more different interface. In environments where multiple network paths are available simultaneously, it is likely that these different network paths will have different characteristics that are best suited to different classes of traffic. For example, a client 102 with a Wi-Fi interface and a 3G interface may prefer to use the Wi-Fi interface for video traffic and web browsing traffic because the Wi-Fi interface has a higher available capacity and lower cost per byte. The 3G interface may be preferred for voice and email traffic due to security and quality concerns.

In addition to selective offload, the encapsulation network described above provides a mechanism to determine when a network path is capable of having traffic switched onto it or removed from it. As described above, the quality of a network path can be determined via the aggregate of a number of different metrics, including physical quality, latency, bandwidth, and packet loss, and the like. The quality of the network path affects different types of traffic in different manners and the data packets can be intelligently and dynamically routed accordingly.

Specifically, different types of traffic are characterized by different metrics. For example, voice traffic is sensitive to both latency and latency jitter, video traffic is bandwidth sensitive, web traffic is sensitive to latency, and the like. Each metric is measured using a different algorithm, and many of these algorithms require additional data transmission to calculate accurate estimations. In order to minimize overhead, the required metrics are measured based upon the observed traffic. When new traffic is detected that requires metrics not currently being recorded, a default network path can be used until a more appropriate network path is determined, then seamlessly migrated, using the selective offload discussed above.

Yet further, the client 102 can be configured to selectively bypass the encapsulation network for specific type of data packets, certain types of traffic, in certain circumstances or a combination thereof. In such instances the client routes the data packets to one of the network interfaces for transmission. The data packets are not encapsulated or scheduled by the client 102 and transmitted using a state-of-the-art or other proprietary transmission scheme.

The encapsulation network 100 provides the ability to perform a seamless handoff using measured parameters at both the client 102 and the network component 106, instead of making a handoff as instructed by the network component, as is done in the 3GPP specification today. A seamless handoff is performed when an application is moved from a network path that is 'going away' to another network path that is still available. This feature is particularly useful for real-time applications, such as voice calls or videoconferencing, where an interruption in service would be noticeable to the user.

An example algorithm for performing a seamless handoff between a Wi-Fi network path and a 3G network path involves measuring the packet loss rate and the physical signal strength of each available network path. If the packet loss rate is low and the signal is strong, the corresponding interface is marked as being 'Good'. If both interfaces are 'Good', then the Wi-Fi interface is preferred due to its presumed lower per-packet cost. If the packet drop rate begins to increase and exceeds a packet drop threshold, the corresponding interface is marked as 'Unstable'. This does not cause the traffic to be transitioned off the interface, but causes the other interface to be primed to pass traffic. This is beneficial because some networks paths, such as 3G, require an initialization period before data packets can be delivered to the other side. If the network path continues to degrade and the signal strength drops below a signal strength threshold, the corresponding network interface will be placed in a 'Bad' state, and the traffic flow is migrated to another network path.

If an interface is in the 'Bad' state and the signal strength exceeds some signal strength threshold, the interface will be further analyzed to determine if the packet loss rate is high. If the signal strength remains above this threshold and the packet drop rate decreases, the link will be placed in an 'Unstable' state. If the packet drop rate decreases below some packet drop threshold, the interface will be placed back in the 'Good' state.

Another example of an algorithm for performing a seamless handoff involves measuring a number of metrics about a network; bandwidth, latency, packet loss rate, and the like, as well as a number of indicators about the network; signal strength, latency variance, cost per byte, and the like. In this example, the network paths are weighted against each other by combining all of the metrics in a configurable way and coming to a weighted ranking of available network paths. The network path with the highest ranking is chosen to pass traffic over.

If another network path becomes higher ranked, then the traffic is handed off to the higher ranked network path. If the metrics and indicators of the highest-ranked network path indicate that the network path is getting worse, the traffic is handed off to the next highest ranked network path. This pre-emptively hands off the traffic to minimize impact to the application. Even though the highest ranked network path may not end up becoming unusable, it avoids a situation where the best network does become unusable and the time to handover the traffic becomes noticeable to the user.

A further example improves the quality of a seamless handoff by performing a 'soft handover'. That is, during a handoff from one network path to another network path, some packets are sent over both network paths, and reordered at the receiving end to avoid packet drops and minimize the impact to the application. This step is performed as out-of-order packets have a well-known detrimental impact on many protocols, including streaming protocols, such as TCP, and real-time protocols, such as RTP. This approach is not restricted to a single link-layer technology, but is link-layer agnostic and functions across all networks paths.

When packets are duplicated they are marked with the same sequence number before transmission across some, or all, of the available network paths. When the network component 106 or client 102 receives the first packet it sends it on and drops all of the subsequent duplicates received. The use of a sequence number, which is global for all available network paths, simplifies the implementation. That is, sequence numbers are globally incrementing so received sequence numbers below the 'last seen' sequence number can simply be dropped. It may not be required for the system to reorder packets coming in over different interfaces, as some applications are not sensitive to out-of-order packets, yet it is also possible to enforce absolute ordering if desired at the cost of more memory and complexity. Further, it is possible to apply ordering to traffic from some types of flows, while allowing other flows to pass unordered.

Figure 4:
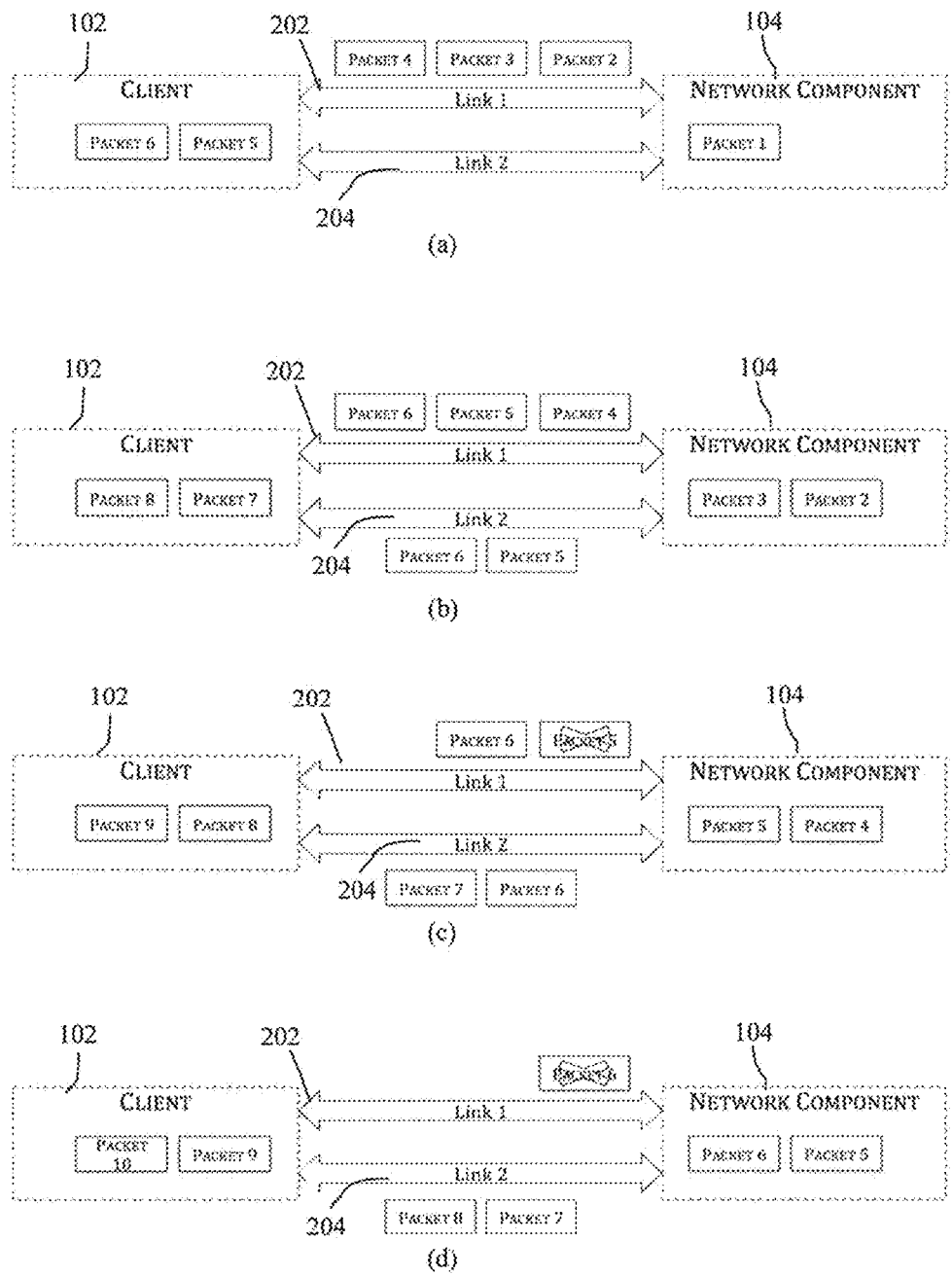
FIG. 4 is a series of flows illustrating how the encapsulation system can perform a soft handoff to minimize application interruption when a network path is interrupted.

Referring to FIG. 4, an example of the beginning of a soft handover is illustrated. As shown in FIG. 4a, the client 102 is transmitting traffic over a first network path 402 to the network component 106. No traffic is being transmitted over a second network path 404.

At some point, the first network path 402 begins to fail. The client 102 notices this failure, and begins duplicating packets across both network paths, as shown in FIG. 4b. In this example, Packet 4 was transmitted before the first network path 402 began to fail, so it was not duplicated. However both Packet 5 and Packet 6 are duplicated.

As Packet 5 and Packet 6 traverse the first and second network paths 402 and 404, the failure of the first network path 402 delays the packets thereon, causing Packet 5 to arrive at the network component 106 over the second network path 404 first. This is shown in FIG. 4c. The network component 106 has marked Packet 5 as arrived. Accordingly, when Packet 5 arrives from the first link 402, it will be discarded. At this point in time, it is possible for the first network path 402 to fail to deliver any packets to the network component 106, as the second network path 404 has shown itself capable of successfully delivering packets. Thus, if the first network path 402 degrades to the point that it is unable to deliver either Packet 5 or Packet 6, it would be transparent to the user. Also at this point in time, the client 102 has determined that the first network path 402 is insufficient for use, and has begun sending traffic only over the second network path 404.

Referring to FIG. 4d, the handover has been completed by the time Packet 6 arrives over the second network path 404. The client 102 continues to use the second network path 404 for new packets, and the network component 106 will discard Packet 6 upon its arrival over the first network link. By observing the behaviour of the packets, it is possible for the network component 106 to interpret the arrival of packets over the second network path 404 as indicating that the first network path 402 has failed. This allows the network component 106 to return packets properly to the client 102 via the second network path 404 without requiring that an explicit control message be sent.

Accordingly it will be appreciated that a soft handover, from the first network path 402 to the second network path 404 is achieved.

The previously described algorithms for performing seamless handoff of network traffic can be combined with the bandwidth aggregation algorithms. Therefore, certain classes of traffic that are primarily single-stream, real-time applications, such as voice or videoconferencing, use the 'best' available network, while other, bandwidth-hungry applications, such as video downloading or web browsing, are able to use both networks simultaneously. The number of schedulers, and the number of types of traffic each scheduler can handle, is not limited. Indeed, custom schedulers can be written and deployed from the network component 106 to the client 102 based upon policy without requiring an interruption or restart of the encapsulation system 100.

The ability to dynamically and easily customize schedulers facilitates running over any network path, regardless of protocol type and regardless of the performance. Although some existing solutions are capable of sending traffic over a number of different network paths, each network type has different characteristics that impacts their suitability for passing certain classes of traffic. The encapsulation system described here, in contrast, is capable of handling each class of network by customizing the scheduling policy used. For example, since 3G networks need to be 'primed' for up to 1.5 seconds before data can be passed, a seamless scheduler described above takes this into consideration and ensures traffic is not prematurely handed off to a particular network which is not ready for traffic. By providing a flexible, customizable scheduling framework, it is easy to extend the types of network supported as new networks are deployed. For example, a custom extension to support post-LTE networks could be added once their characteristics become defined.

Further, as previously described, NAT is a mechanism deployed on the Internet to allow multiple machines to share the same IP address by rewriting both incoming and outgoing packets with a new IP address and transport protocol port. This rewriting is bidirectional, and requires a state table to map the internal IP address and transport protocol type and port to the outbound IP address and transport protocol type and port. The entries in these state tables expire after a certain amount of time, or when the connection is closed.

The expiration of a TCP connection state is typically tied to the reception of a TCP Close message, as all TCP connections have a teardown phase that a NAT device can watch for. The expiration of UDP connection state is typically based upon how long it has been since the last packet has been detected, as UDP does not have a common teardown phase the NAT device can watch for. UDP connections are typically aggressively expired after traffic is not seen for short periods of time, as memory is finite and keeping these records around for longer periods of time could overflow the available memory for the state table.

As a result, traditional encapsulation systems use a NAT keepalive mechanism that entails sending a keepalive packet at a fixed interval if no other packets have been transmitted. This keepalive interval can be statically configured, however this is not ideal as different NAT systems can have different timeout intervals, and such a static configuration would need to be the smallest value that would work at any site. This could result in a lot of signalling overhead if encapsulated traffic is sporadic, increasing the cost of operating the system and wasting network capacity.

Therefore, instead of a static keepalive interval, the present embodiment only establishes channels as necessary, and does not continue to transmit keepalives if no traffic is to be sent over the channel. Initially, if traffic has not been transmitted across a UDP data channel for a predefined amount of time, corresponding to a typical NAT UDP timeout interval, the system will send a keepalive packet. The system will continue transmitting keepalive packets for a predefined amount of time before the channel is decided to be unused and the NAT mapping is allowed to expire.

If, at some point in the future, the client 102 wishes to use this channel again, it will establish a new channel and pass data across this newly established channel. The network component 106 will update its mapping table to associate this new channel with the proper client, as if the client was simply establishing a new channel. If the network component 106 wishes to use this channel again, the network component 106 will send a 'force refresh' message to the client 102 using the TCP-based control channel, which has not been closed nor timed out. The client 102 will then re-establish the data channel, and the network component 106 will again be able to pass traffic to the client 102. The control channel will not have timed out because NAT devices do not transparently time out TCP connections. If the mapping has to be removed, the NAT device would send TCP close messages to both the client 102 and the network component 106, allowing both to recognize the control channel can no longer be used. This would cause the client 102 to re-establish the control channel.

If the client 102 is connected to the network component 106 using multiple channels, and the desired channel is in the middle of doing a NAT refresh, one of the other channels can be used to transmit data until the desired data channel has been refreshed.

Further, a NAT refresh can be dynamically initiated based upon packet loss rates detected on the channel. For example, when the client 102 sends a packet to the network component 106, or vice versa, and the other side fails to acknowledge receipt of the packet, NAT is refreshed to ensure that both devices are communicating over a channel which is capable of passing data.

Accordingly, as described above, in order to improve performance of the encapsulation system, intelligence is provided at both the client 102 and the network component 106. This solution allows the client 102 and the network component 106 to make decisions independently, thereby increasing the level of control and the performance of the data transmission. Independent decision-making allows both client 102 and network component 106 to make the best decision possible, given the knowledge of the system that resides at the device making the decision. For example, it is possible to pre-emptively block traffic before it is sent over a high-cost network link; it is possible to enforce network policies on a trusted device; and it is possible to make more intelligent traffic routing decisions in a multi-network path scenario as an intelligent network component 106 has the ability to work cooperatively with the client 102 to select the optimal link.

Furthermore, the intelligent co-operation of the client 102 and the network component 106 facilitates network traffic optimization that is not possible using state of the art solutions. For example, as previously described, if the network component 106 receives traffic destined for the client 102 after a connection on the selected network path has timed out, the network component 106 can request that the client 102 re-establish the connection. Without this intelligent co-operation, the client 102 would need to transmit keepalive probes to the network component 106 at predetermined intervals, even when there is no data to transmit to reduce the likelihood of the connection timing out. This repeated transmission of keepalive probes wastes bandwidth, which can be costly.

Using the foregoing specification, the invention may be implemented as a machine, process or article of manufacture by using standard programming and/or engineering techniques to produce programming software, firmware, hardware or any combination thereof.

Any resulting program(s), having computer-readable instructions, may be stored within one or more computer-usable media such as memory devices or transmitting devices, thereby making a computer program product or article of manufacture according to the invention. As such, the term "software" or "modules" as used herein is intended to encompass a computer program existent as instructions on any computer-readable medium such as on any memory device or in any transmitting device, that are to be executed by a processor.

Examples of memory devices include hard disk drives, diskettes, optical disks, magnetic tape, semiconductor memories such as FLASH, RAM, ROM, PROMS, and the like. Examples of networks include, but are not limited to, the Internet, intranets, telephone/modem-based network communication, hard-wired/cabled communication network, cellular communication, radio wave communication, satellite communication, and other stationary or mobile network systems/communication links. The client device 102 does not need to be mobile and the first and second access points 104 and 106 do not need to provide a wireless connection to the network.

A machine embodying the invention may involve one or more processing systems including, for example, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

Using the description provided herein, those skilled in the art will be readily able to combine software created as described with appropriate general purpose or special purpose computer hardware to create a computer system and/or computer subcomponents embodying the invention, and to create a computer system and/or computer subcomponents for carrying out the method of the invention.

Although preferred embodiments of the invention have been described herein, it will be understood by those skilled in the art that variations may be made thereto without departing from the scope of the appended claims.

What is claimed is:

1. An intelligent network component for facilitating communication of traffic between a destination server and a client over a network comprising a plurality of network paths, the network component comprising:
    memory for storing computer-readable instructions; and
    a processor configured to implement the computer-readable instructions, the computer-readable instructions operable to:
        intermittently exchange status information with the client via a control channel using one or more of the plurality of network control paths, the status information including network performance parameters of the plurality of network paths;
        encapsulate the traffic for transmission to the client;
        decapsulate the traffic received from the client; and
        selectively schedule traffic to the client via multiple ones of the plurality of network paths using logic common with the client based on the status information exchanged with the client.

2. The intelligent network component of claim 1, wherein the traffic is transmitted to the client and received from the client using a User Datagram Protocol (UDP).

3. The intelligent network component of claim 2, wherein the traffic is transmitted to the client and received from the client using a Transmission Control Protocol (TCP) when the UDP cannot be used.

4. The intelligent network component of claim 1, wherein the plurality of network paths include one or more wired network paths, one or more wireless network paths, or a combination thereof.

5. The intelligent network component of claim 4, wherein the wireless network path includes one or more of a mobile telecommunication network, a Wi-Fi network, a WiMax network, a Bluetooth network, or any other Layer 2 protocol conveying IP packets.

6. The intelligent network component of claim 1, wherein the control channel is further used to exchange network policies from the network component to the client and vice versa.

7. The intelligent network component of claim 6, wherein the network policies are enforced by the network component thereby inhibiting the client's ability to circumvent them.

8. The intelligent network component of claim 7, wherein the network policies are enforced by applying them to traffic destined to or generated by the client.

9. The intelligent network component of claim 7, wherein the network policies are enforced by terminating communication with the client if the client violates the network policies.

10. The intelligent network component of claim 7, wherein the network policies are enforced by reporting the client to a system administrator if the client violates the network policies.

11. The intelligent network component of claim 7, wherein the network policies are retrieved from a local policy store, an external policy store a centralized database of policies for the client, or any combination thereof.

12. The intelligent network component of claim 1, wherein data packets in the traffic are scheduled differently depending on the type of the packet or the type of data contained therein, or a combination thereof.

13. The intelligent network component of claim 1, wherein the traffic is moved from being scheduled on one of the plurality of network paths to being scheduled on another of the plurality of network paths as a result of a change in one or more of the network paths, a change in one or more of the policies, a change in one or more of the conditions that are a part of an existing applied policy, or any combination thereof.

14. A communication system for facilitating communication of traffic between a network component and a client over a network using a plurality of network paths, both the client and the network component comprising:
    memory for storing computer-readable instructions; and
    a processor configured to implement the computer-readable instructions, the computer-readable instructions operable to:
        intermittently exchange status information between the client and the network component via a control channel using one or more of the plurality of network control paths, the status information including network performance parameters of the plurality of network paths;
        encapsulate the traffic for transmission to the other of the client or the network component;
        decapsulate the traffic received from the other of the client or the network component; and
        selectively schedule traffic between the client and the network component via multiple ones of the plurality of network paths using logic common with each other and based on the status information.

15. The communication system of claim 14, wherein the client is a personal communication device or a peripheral device in communication with the personal communication device.

16. The communication system of claim 14, wherein the client further comprises client-specific logic.

17. The communication system of claim 14, wherein the network component further comprises network component-specific logic.

18. The communication system of claim 13, wherein the client acts as a router for other network components situated behind the client device.

19. The communication system of claim 14, wherein the control channel is further used to exchange network policies that are enforced by the client, by having the client refuse to connect with network components that are unable to enforce the network policies.

20. The communication system of claim 19, wherein the client attempts to discover new network components that are capable of enforcing the policies applied to it.

21. An intelligent client for facilitating an exchange of traffic with a destination server via a network component over a network using a plurality of network paths, the client comprising:

memory for storing computer-readable instructions; and a processor configured to implement the computer-readable instructions, the computer-readable instructions operable to:

intermittently exchange status information with the network component via a control channel using one or more of the plurality of network control paths, the status information including network performance parameters of the plurality of network paths;

encapsulation the traffic for transmission to the network component;

decapsulate the traffic received from the network component; and selectively schedule traffic to the network component via multiple ones of the plurality of network paths using logic common with the network component based the status information exchanged with the network component.

22. The intelligent client of claim 20, further comprising instructions to selectively route traffic to a network interface for transmission across the network without performing the encapsulation.

* * * * *